US009481256B2

(12) United States Patent
Arkus et al.

(10) Patent No.: US 9,481,256 B2
(45) Date of Patent: Nov. 1, 2016

(54) ONBOARD GENERATOR DRIVE SYSTEM FOR ELECTRIC VEHICLES

(71) Applicant: AMP Electric Vehicles Inc., Loveland, OH (US)

(72) Inventors: Alan J. Arkus, Amelia, OH (US); Stephen S. Burns, Maineville, OH (US); Donald L. Wires, Loveland, OH (US)

(73) Assignee: AMP Electric Vehicles Inc., Loveland, OH (US)

( * ) Notice: Subject to any disclaimer, the term of this patent is extended or adjusted under 35 U.S.C. 154(b) by 96 days.

(21) Appl. No.: 14/606,497

(22) Filed: Jan. 27, 2015

(65) Prior Publication Data
US 2015/0210152 A1    Jul. 30, 2015

Related U.S. Application Data

(60) Provisional application No. 61/933,350, filed on Jan. 30, 2014.

(51) Int. Cl.
*B60W 10/02* (2006.01)
*B60L 11/18* (2006.01)
(Continued)

(52) U.S. Cl.
CPC .......... *B60L 11/1809* (2013.01); *B60K 6/387* (2013.01); *B60K 6/44* (2013.01); *B60K 6/48* (2013.01); *B60L 11/08* (2013.01); *B60L 11/12* (2013.01); *B60L 11/14* (2013.01); *B60W 10/02* (2013.01); *B60W 20/00* (2013.01); *Y02T 10/623* (2013.01); *Y02T 10/6221* (2013.01);
(Continued)

(58) Field of Classification Search
CPC .... B60W 10/04; B60W 10/06; B60W 10/08; B60K 2006/262

USPC ................ 180/65.26, 65.28, 65.265, 65.285; 320/109
See application file for complete search history.

(56) References Cited

U.S. PATENT DOCUMENTS

3,388,559 A    6/1968  Johnson
4,531,605 A *  7/1985  Scholz .................. B60K 6/105
                                                    180/165
(Continued)

FOREIGN PATENT DOCUMENTS

DE   102008061449 A1   6/2010
WO      2011060362 A1   5/2011

OTHER PUBLICATIONS

The International Searching Authority, The International Search Report and the Written Opinion of the International Searching Authority, or theDeclaration, PCT/US2011/058018, Mar. 7, 2012, 7 pgs.

*Primary Examiner* — Jeffrey J Restifo
(74) *Attorney, Agent, or Firm* — Wood Herron & Evans LLP

(57) ABSTRACT

An electric vehicle utilizes an internal combustion engine to drive the vehicle's main electric drive system in the regeneration mode and to charge the battery when the vehicle is stopped. The electric vehicle's main drive controller and motor are used as the generator to recharge the battery when the vehicle is stopped via a clutch mechanism allowing the motor to act as a generator while the vehicle is at rest. As the vehicle proceeds throughout the drive cycle, the vehicle is powered by the electric motor from the battery. The battery is recharged to a specified state of charge when the vehicle is parked. The internal combustion engine only operates to charge the battery, and the electric motor is used to propel the vehicle.

19 Claims, 3 Drawing Sheets

(51) Int. Cl.
*B60K 6/387* (2007.10)
*B60K 6/44* (2007.10)
*B60K 6/48* (2007.10)
*B60W 20/00* (2016.01)
*B60L 11/08* (2006.01)
*B60L 11/12* (2006.01)
*B60L 11/14* (2006.01)

(52) U.S. Cl.
CPC ........ *Y02T 10/7005* (2013.01); *Y02T 10/7077* (2013.01); *Y10S 903/903* (2013.01); *Y10S 903/946* (2013.01)

(56) References Cited

U.S. PATENT DOCUMENTS

| | | | |
|---|---|---|---|
| 5,195,389 A | 3/1993 | Isozumi | |
| 5,345,155 A | 9/1994 | Masaki et al. | |
| 5,372,213 A | 12/1994 | Hasebe et al. | |
| 5,489,001 A * | 2/1996 | Yang | B60K 3/04 180/65.21 |
| 5,643,119 A | 7/1997 | Yamaguchi et al. | |
| 5,667,286 A | 9/1997 | Hoying et al. | |
| 5,749,062 A | 5/1998 | Yamamoto et al. | |
| 5,845,732 A | 12/1998 | Taniguchi et al. | |
| 5,855,379 A | 1/1999 | Buma et al. | |
| 5,973,463 A | 10/1999 | Okuda et al. | |
| 6,053,583 A | 4/2000 | Izumi et al. | |
| 6,109,122 A | 8/2000 | Bori et al. | |
| 6,205,379 B1 | 3/2001 | Morisawa et al. | |
| 6,226,587 B1 | 5/2001 | Tachihata et al. | |
| 6,295,487 B1 | 9/2001 | Ono et al. | |
| 6,370,461 B1 | 4/2002 | Pierce et al. | |
| 6,370,470 B1 | 4/2002 | Yamamura et al. | |
| 6,401,850 B1 | 6/2002 | Bowen | |
| 6,419,040 B2 | 7/2002 | Kitano et al. | |
| 6,428,442 B1 | 8/2002 | Turgay et al. | |
| 6,453,228 B1 | 9/2002 | Shimada | |
| 6,490,511 B1 | 12/2002 | Raftari et al. | |
| 6,499,549 B2 | 12/2002 | Mizon et al. | |
| 6,524,215 B1 | 2/2003 | Schmidt | |
| 6,704,622 B2 | 3/2004 | Tinskey et al. | |
| 6,808,470 B2 * | 10/2004 | Boll | B60K 6/442 180/65.23 |
| 6,909,959 B2 | 6/2005 | Hallowell | |
| 6,988,779 B2 | 1/2006 | Amanuma et al. | |
| 7,112,155 B2 | 9/2006 | Keuth | |
| 7,237,639 B2 | 7/2007 | Kowatari et al. | |
| 7,423,393 B2 | 9/2008 | Wakao et al. | |
| 7,469,169 B2 * | 12/2008 | Dreibholz | B60W 20/11 180/65.23 |
| 7,497,285 B1 * | 3/2009 | Radev | B60K 6/26 180/65.225 |
| 7,520,354 B2 | 4/2009 | Morrow et al. | |
| 7,542,838 B2 | 6/2009 | Bouchard et al. | |
| 7,583,036 B2 | 9/2009 | Kikuchi et al. | |
| 7,665,560 B2 | 2/2010 | Gelinas | |
| 7,670,257 B2 * | 3/2010 | Popp | B60K 6/48 477/174 |
| 7,699,737 B2 | 4/2010 | Berhan | |
| 7,739,005 B1 | 6/2010 | Tang | |
| 7,783,402 B2 | 8/2010 | Sawada et al. | |
| 7,828,687 B2 | 11/2010 | Nagy et al. | |
| 7,874,389 B2 | 1/2011 | Feliss et al. | |
| 7,878,281 B2 * | 2/2011 | Tanishima | B60K 6/48 180/65.265 |
| 7,957,881 B2 | 6/2011 | Itoh | |
| 7,983,833 B2 | 7/2011 | Sugai | |
| 8,226,524 B2 * | 7/2012 | Gloge | B60K 6/48 180/65.26 |
| 8,332,112 B2 | 12/2012 | Handa et al. | |
| 8,360,929 B2 * | 1/2013 | Beer | B60W 10/02 180/65.28 |
| 8,414,450 B2 * | 4/2013 | Ueno | B60K 6/365 180/65.265 |
| 8,453,772 B2 * | 6/2013 | Brown | B60L 15/20 180/65.285 |
| 8,474,556 B2 * | 7/2013 | Wang | B60K 6/40 180/65.22 |
| 8,480,536 B2 * | 7/2013 | Weiss | B60K 6/48 180/65.25 |
| 8,480,537 B2 * | 7/2013 | Sano | B60K 6/48 180/65.285 |
| 8,510,007 B2 * | 8/2013 | Mori | B60K 6/48 180/65.21 |
| 8,521,349 B2 | 8/2013 | Yu et al. | |
| 8,529,399 B2 * | 9/2013 | Schenk | B60K 6/48 477/3 |
| 8,534,399 B2 * | 9/2013 | Soliman | B60K 6/48 180/65.21 |
| 8,535,200 B2 * | 9/2013 | Vyas | B60K 6/365 180/65.265 |
| 8,540,604 B1 * | 9/2013 | Nefcy | B60W 10/08 477/15 |
| 8,541,915 B2 | 9/2013 | Burns et al. | |
| 8,555,844 B2 * | 10/2013 | Van Druten | F02N 5/04 123/179.22 |
| 8,565,990 B2 * | 10/2013 | Ortmann | B60K 6/48 701/1 |
| 8,579,748 B2 * | 11/2013 | Kawasaki | B60K 6/48 180/53.5 |
| 8,579,759 B2 * | 11/2013 | Akebono | B60W 10/02 180/65.285 |
| 8,583,308 B2 * | 11/2013 | Miyazaki | B60L 1/003 180/65.265 |
| 8,583,309 B2 * | 11/2013 | Kaita | B60K 6/445 180/65.265 |
| 8,589,005 B2 * | 11/2013 | Kaltenbach | B60K 6/48 180/65.285 |
| 8,590,648 B2 * | 11/2013 | Poschmann | B60K 1/02 180/65.22 |
| 8,606,482 B2 * | 12/2013 | Carlhammar | B60K 6/387 180/65.21 |
| 8,645,042 B2 * | 2/2014 | Carlhammar | B60K 6/387 180/65.21 |
| 8,781,661 B2 * | 7/2014 | Gunther | B60K 6/48 180/65.26 |
| 8,834,320 B2 * | 9/2014 | Nefcy | F16D 48/06 477/176 |
| 8,858,390 B2 * | 10/2014 | Schiele | B60K 6/48 475/5 |
| 9,018,895 B2 * | 4/2015 | Endo | B60K 6/445 180/2.1 |
| RE46,017 E * | 5/2016 | Yang | B60K 6/445 |
| 2003/0019674 A1 * | 1/2003 | Duan | B60K 6/44 180/65.225 |
| 2003/0054910 A1 * | 3/2003 | Nett | B60K 6/365 475/5 |
| 2003/0069104 A1 * | 4/2003 | Nakano | B60K 6/38 475/5 |
| 2003/0073534 A1 * | 4/2003 | Oshidari | B60K 6/365 475/5 |
| 2003/0116373 A1 | 6/2003 | Miller et al. | |
| 2003/0216215 A1 | 11/2003 | Suzuki et al. | |
| 2003/0229429 A1 | 12/2003 | Zhang et al. | |
| 2004/0133321 A1 | 7/2004 | Ghoneim et al. | |
| 2006/0041353 A1 | 2/2006 | Sawada et al. | |
| 2006/0116233 A1 | 6/2006 | Gradu | |
| 2007/0038340 A1 | 2/2007 | Sekiguchi et al. | |
| 2007/0175681 A1 * | 8/2007 | King | B60K 6/26 180/65.25 |
| 2008/0220934 A1 | 9/2008 | Babcock et al. | |
| 2009/0012665 A1 | 1/2009 | Brennan et al. | |
| 2009/0118885 A1 | 5/2009 | Heap et al. | |
| 2010/0036577 A1 | 2/2010 | Kodama et al. | |
| 2010/0219706 A1 * | 9/2010 | Watanabe | B60K 6/543 310/107 |
| 2010/0222953 A1 | 9/2010 | Tang | |
| 2011/0114399 A1 | 5/2011 | Palfai et al. | |
| 2011/0115320 A1 | 5/2011 | Palfai et al. | |
| 2011/0115321 A1 | 5/2011 | Chamberlin et al. | |
| 2012/0150376 A1 | 6/2012 | Ash et al. | |
| 2012/0262016 A1 * | 10/2012 | Wang | B60K 6/12 310/77 |

(56) References Cited

U.S. PATENT DOCUMENTS

| | | | | |
|---|---|---|---|---|
| 2014/0081563 A1* | 3/2014 | Wang | ................ | F01N 9/007 701/113 |
| 2014/0228167 A1* | 8/2014 | Frank | ................ | B60K 6/442 477/5 |
| 2014/0229043 A1* | 8/2014 | Frank | ................ | B60W 20/20 701/22 |
| 2014/0349809 A1* | 11/2014 | Kim | ................ | B60W 20/10 477/4 |
| 2015/0066257 A1* | 3/2015 | Ochocinski | ......... | B60K 28/066 701/22 |

* cited by examiner

ONBOARD GENERATOR DRIVE SYSTEM FOR ELECTRIC VEHICLES

CROSS REFERENCE TO RELATED APPLICATION

This application claims the benefit of U.S. Provisional Patent Application Ser. No. 61/933,350, filed on Jan. 30, 2014, and herein incorporated by reference in its entirety.

BACKGROUND OF THE INVENTION

This invention relates to a method and a system for the operation and charging of the batteries of an electric vehicle (EV).

Present day hybrid or extended range electric vehicles may employ an internal combustion engine to provide power to propel the vehicle when the battery pack is depleted or at a low state of charge (SOC) while the vehicle is in motion. Current hybrid electric drive systems utilize an internal combustion coupled to a generator to charge the main drive battery when the vehicle is in motion. The electric motor may be used to generate power to propel the vehicle or alternately used to augment the internal combustion engine as it propels the vehicle.

However, the battery packs required on many such electric vehicles are not optimized for efficiency and the driving parameters of the vehicle. Battery pack size, generator capacity and the size of the internal combustion engine are not optimized for efficient and reliable operation over the vehicle's drive cycles. In many cases, the internal combustion engine and/or the battery packs are over-sized for efficient operation and add extraneous weight to the vehicle.

SUMMARY OF THE INVENTION

A method and system according to embodiments of this invention provide for an extended range option for electric vehicles utilizing an internal combustion engine to drive the vehicle's main electric drive system in the regeneration mode and to charge the main battery when the vehicle is stopped. This invention in various embodiments utilizes the electric vehicle's main drive controller and motor as the generator to recharge the main battery module when the vehicle is stopped via a clutch mechanism allowing the motor to act as a generator while the vehicle is at rest. A system to charge the main battery via the standard J1772 infrastructure or alternatively an induction charging infrastructure for an initial charge may be accomplished at the beginning of the drive cycle. As the vehicle proceeds throughout the drive cycle, the vehicle is powered by the electric motor from the main battery. As the vehicle is stopped and in park, the main battery is recharged to a computed SOC from the main drive motor and controller acting as a generator powered by the internal combustion engine, so as to allow the vehicle to complete its daily drive cycle while not allowing the battery to go below a desired SOC.

It is common for delivery vehicles to be at rest more than in motion. The internal combustion engine provides the needed heat or cooling to keep the cabin at a comfortable temperature during cold or warm weather while the vehicle is stopped. The internal combustion engine may not run the whole time the vehicle is stopped. It only needs to run long enough to make up for the difference in energy that would have been needed if all the energy was coming from a battery large enough to complete the drive or for cabin climate control.

One advantage of this invention is that the high voltage battery module can be much smaller, lighter, and never be fully discharged to prolong the life of the battery as well as reduce overall cost of the vehicle, as only one electric motor is required to propel the vehicle and charge the battery for the duration of its intended drive cycle, as opposed to conventional hybrid vehicles.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Given the description above in general terms, reference will now be made to the accompanying drawings, not necessarily drawn to scale.

The onboard charging of an electric vehicle's main battery module utilizes the same propulsion equipment provided to power the vehicle in its normal propulsion mode. The electric propulsion equipment is alternately coupled and decoupled to an onboard internal combustion engine which is used to charge the battery when the vehicle is stopped and in park mode and the drive shaft system when the vehicle is in the propulsion mode. The battery module may be alternately charged from commercially available J1772 compliant infrastructure or induction charging equipment from any number of suppliers to provide an initial charge. It may alternately be used to charge in an abnormal situation. Various embodiments of the invention are intended to provide an alternative to existing series or parallel hybrid systems in that this invention is less complex and less costly. The battery module size may be modified to accommodate the particular drive cycle. Alternately, the amount of time the internal combustion engine runs when the vehicle is in the stopped mode may be modified to accommodate the desired drive cycle. In addition when the vehicle is in the normal propulsion mode, regenerative energy is also channeled to the main battery pack to extend range and to allow the vehicle to stop with less wear on the conventional braking system.

The embodiments of this invention are purposely designed for the intended drive cycles of the vehicle. The battery module, the internal combustion engine, the main drive motor and the internal charger are optimized for efficiency and cost for the intended drive cycle. The vehicle is always powered by the electric motor assembly while the vehicle is in motion. The internal combustion engine is only used in the stopped/parked state to charge the battery to the desired SOC required to meet the prescribed drive cycle.

Battery module size, generator capacity and other components can be scaled to accommodate varying drive cycles.

Figure 1:
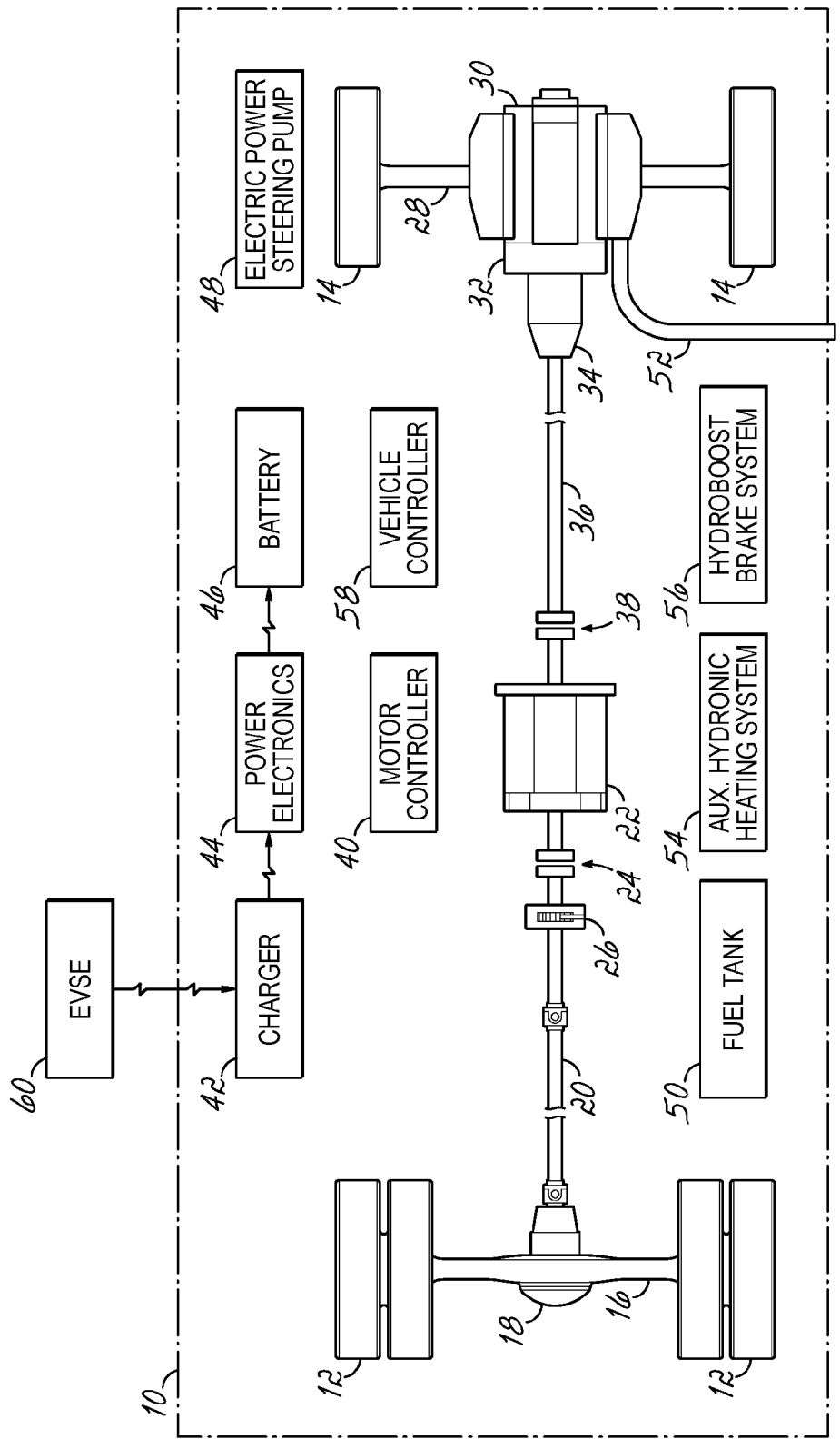
FIG. 1 is a schematic diagram of one embodiment of an electric vehicle according to this invention in one state of operation.

A system configuration of an electric vehicle (EV) 10 suitable for embodiments of this invention is shown in FIG. 1. This EV 10 is a rear-wheel-drive vehicle; that is, a right rear wheel and a left rear wheel are ground engaging, driving wheels 12, and each of the front wheels 14 are driven wheels. The electric vehicle 10 schematically shown in FIGS. 1-3 in one embodiment may be a delivery truck or vehicle, but one of ordinary skill in the art will appreciate that this invention may be utilized not only in a delivery truck, but in many other electric vehicle platforms.

The vehicle 10 is a rear wheel drive vehicle such that right and left rear wheels 12 are mounted on a rear axle 16. The rear axle 16 includes a differential 18 which is coupled to a drive shaft 20 of the vehicle 10. The drive shaft 20 extends from a main motor 22 which may be mounted between a pair of vehicle chassis spaced rails (not shown). The drive shaft 20 includes a clutch assembly 24 downstream from the main motor 22 as well as a park pawl and sprocket assembly 26 between the main motor 22 and the rear axle 16.

Figure 2:
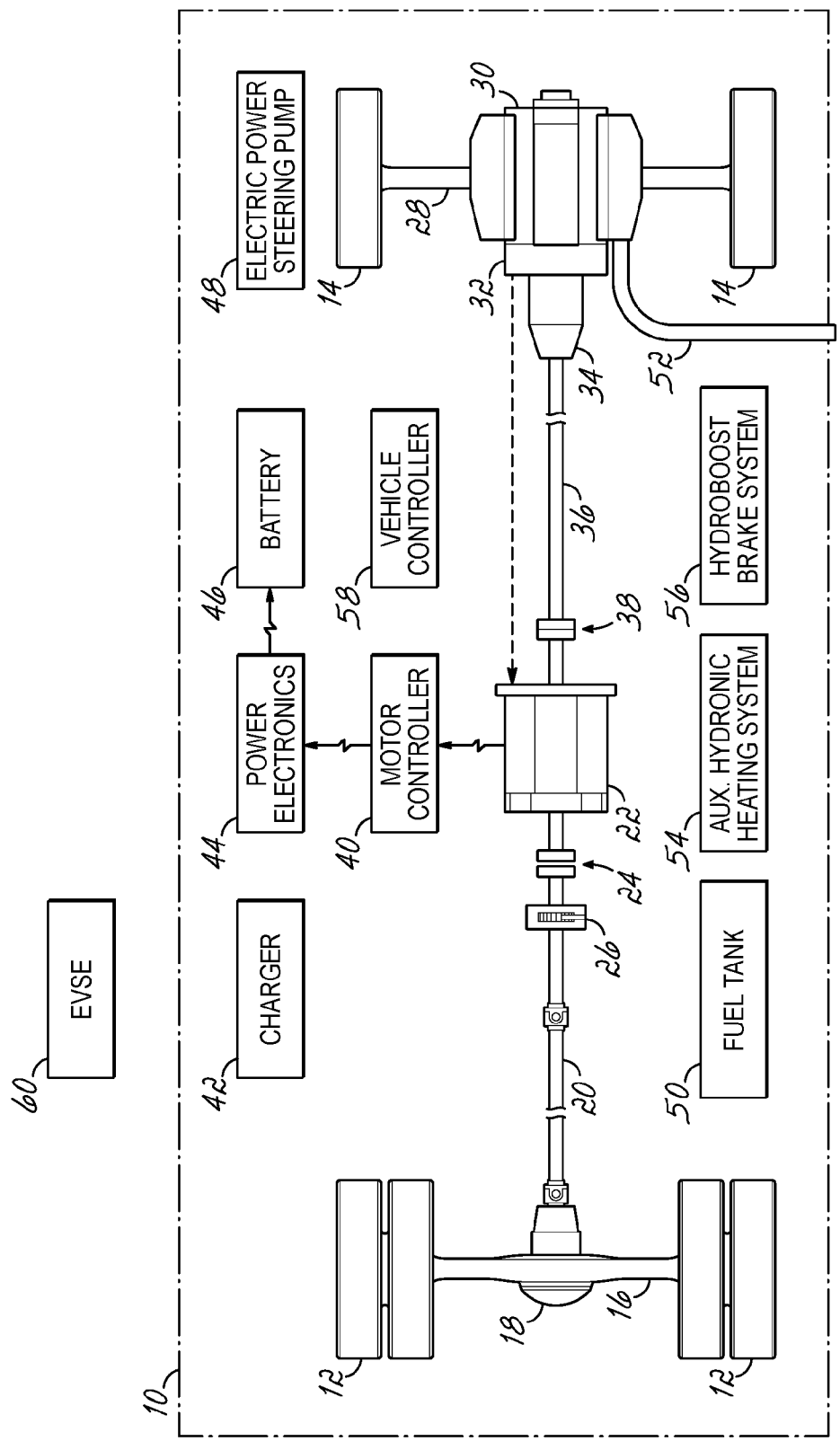
FIG. 2 is a schematic diagram similar to FIG. 1 with the electric vehicle in a second state of operation.
Figure 3:
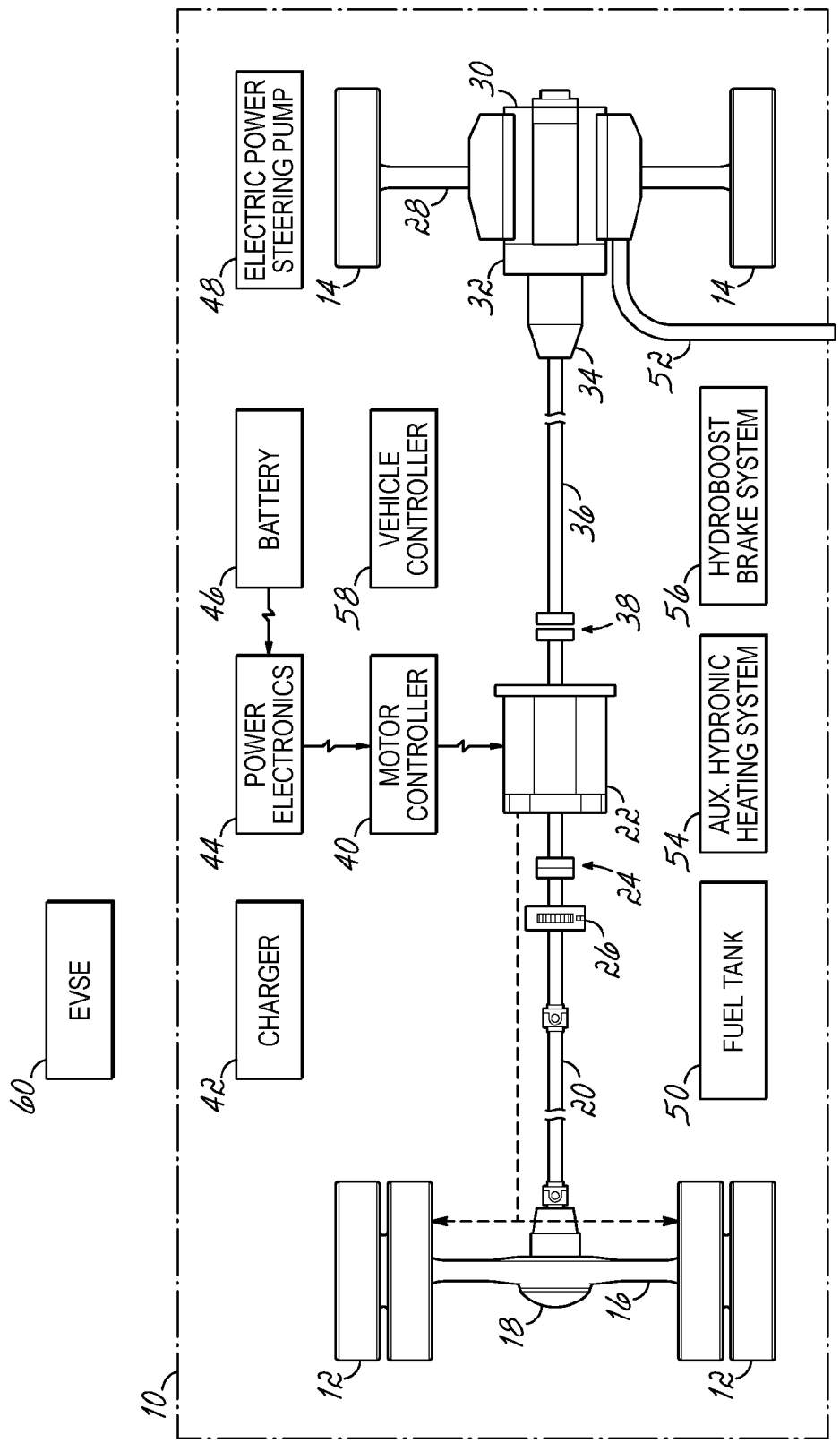
FIG. 3 is a schematic diagram similar to FIG. 1 with the electric vehicle in a third state of operation.

The vehicle 10 also includes the pair of front wheels 14 mounted on a front axle 28. In the current embodiment shown in FIGS. 1-3, the rear wheels 12 are the drive wheels and the front wheels 14 are the driven wheels. The vehicle 10 may also include an internal combustion engine 30 which is shown in FIGS. 1-3 mounted near the front axle 28; however, the engine 30 is not coupled to drive the front wheels 14. The output from the engine 30 may be coupled to a regenerative drive 32 and an optional gear reduction assembly 34. A drive shaft 36 extends from the engine 30 through a clutch assembly 38 and directly into the main motor generator 22. A motor controller 40 is likewise coupled to the main motor 22 as well as a charger 42, power electronics module 44 and a battery module 46. The vehicle 10 may also include an electric power steering pump 48, a fuel tank 50 for the internal combustion engine 30, an exhaust 52 to vent the byproducts of the combustion from the engine 30, an auxiliary hydraulic heating system 54 for the cabin and other areas of the vehicle 10 and a hydro-boost brake system 56 coupled to the wheels 12, 14 for controlling the speed and stopping of the vehicle 10.

The battery module 46 shown in FIG. 1 is a driving power supply coupled to electric motor 22. Current discharged from the battery module 46 is supplied to the motor 22 via an inverter as part of the power electronics 44. The inverter is an electric power converter and converts the discharged power (DC) from the battery 46 to a power type (three phase alternating current in this figure) suitable for the motor 22 under the control of the motor controller 40. The motor controller 40 controls the inverter according to reference torque output from a vehicle controller 58 so that the corresponding motor 22 outputs the real torque corresponding to the reference torque.

The vehicle controller 58 is a control unit for functions such as the output torque control of the motor 22, state monitoring and control of the respective onboard components, the transmission of vehicle conditions to a crew, and the like. The vehicle controller 58 can be realized by modifying the software of a conventional electronic control unit. Output from various kinds of sensors provided on various parts of the vehicle 10 is input into the vehicle controller 58 and is utilized for controlling the motor output and monitoring the vehicle conditions.

FIGS. 1-3 show the overall concept of the invention in its various operating modes.

State 1 is shown in FIG. 1 when the vehicle 10 is stopped for an extended period of time and connected to a standard battery charging station 60 such as J1772, CHAdeMO, Induction charging, etc. The electric energy flows from the external charging source 60 such as an EVSE, via the charger 42, power switching logic of the power electronics 44 and into the battery module 46. Clutches 24, 38 are disengaged or open such that no energy flows into or from the main electric drive motor 22 or the internal combustion engine 30.

FIG. 1 shows one embodiment of the invention where one of three states of operation of the vehicle 10 is described along with a summary of power flow through the major system components. State 1 of the vehicle 10 is a normal state where the vehicle 10 is parked and connected to a standard J1772 Level 2 charging infrastructure 60 such as a Clipper Creek 100CS level 2 EVSE or alternately to a Momentum Dynamics induction charging station or equivalent. In this state, energy from the grid is directed thru the EVSE 60, alternately an induction charging system via an onboard charger 42 such as the EDN model 348 7KW units, thru the power electronics 44, including the appropriate power switching and logic technology, and into the high voltage battery 46. The high voltage battery module 46 may be comprised of any number of manufacture's high power cells for a combined voltage of 600 volts DC, but not greater than 700 volts DC, in various embodiments. In the present embodiment of the invention, the battery 46 has a capacity of 45 kWh usable energy. It is understood that the battery 46 may be of varying size dependent of the intended use of the vehicle 10. The high voltage battery 46 is monitored and controlled via an integrated battery management system (BMS) such as one supplied by the cell manufacturer or an independent supplier such as the Orion BMS manufactured by EWERT Energy Systems. In state 1, the onboard internal combustion engine 30, in this embodiment a PSI 2.4 L multi fuel engine, is in the off position and decoupled from any other component in the drive system. Additionally in state 1 the electric motor/generator 22, in this embodiment a TM4 1850 series with a CO200HV-A1 controller, is also in the off position and decoupled from drive system.

State 2 is shown in FIG. 2 when the vehicle 10 is in the parked mode, such as when the driver is parked and absent from the vehicle 10 making package delivery to a business or residence, or stopped for lunch. In this state, clutch 38 is engaged or closed and clutch 24 is disengaged or open such that the energy flow is from the internal combustion engine 30 via clutch 38, which turns the electric motor 22 causing the regenerative drive in the generator mode to provide energy back into the main battery 46 in proportion to a predetermined amount necessary to provide the required state of charge (SOC) for the particular route. At the initiation of state 2 when clutch 38 is closed and clutch 24 is open, briefly power flows from the main battery 46 thru the motor controller 40 to the motor 22 to start the internal combustion engine 30. As soon as the internal combustion engine 30 starts, the motor controller 40 switches to the generator mode to direct power flow to the battery 46 as described above.

State 2 of the vehicle 10 is a normal state of operation where the vehicle is stopped and in park mode. The vehicle 10 is not connected to the grid, but is capable of being charged via the onboard internal combustion engine 30 and onboard electric propulsion drive system. In state 2, if the appropriate algorithm requires the battery 46 to accept energy, the internal combustion engine 30 is turned on, clutch 38 is closed and clutch 24 is open. The vehicle 10 does not move. Rotation of the internal combustion engine 30 coupled to the electric motor 22 and the electric motor 22 being in the generator mode causes energy from the electric motor 22 in the generator mode to supply energy to the battery 46 in an amount determined by specific control algorithms required by the drive cycle being executed at that specific time. It is understood that the amount of energy replaced in the battery 46 is in addition to the amount provided by the vehicle's regenerative capability while the vehicle 10 is in motion.

State 3 is shown in FIG. 3 when the vehicle 10 is in motion during its normal drive cycle. In this case clutch 38 is open and clutch 24 is closed, directing energy flow from the battery 46, power electronics 44, motor controller 40 and motor 22 to the differential 18, axle 16 and finally to the rear wheels 12.

State 3 of the vehicle 10 is the normal mode of the vehicle 10 where it is free to move. In this state the internal combustion engine 30 is in the off mode, clutch 38 is open and clutch 24 is closed. Energy from the battery 46 flows thru the power electronics 44 and logic in the normal fashion that is common to electric vehicles, that is, energy from the battery 46 is routed thru the power electronics 44 under supervisory control to the electric drive system with the motor 22 in the normal motor mode to provide torque thru the differential 18 to the wheels 12 causing motion of the vehicle 10. The electric motor assembly 22 may operate in a drive mode (state 3) or in a generator mode (state 2).

In various embodiments of this invention, the battery module 46 may be, but not limited to, a 45 kWh usable energy system contained in saddle packs each along and contained within a steel frame on either side of the chassis frame rails. The main electric drive motor 22 and its associated speed reducer and clutches 24, 38 may be positioned internal to the chassis frame rails. The internal combustion engine 30 used in the parked generator mode of state 2 along with its associated cooling radiator, fuel system 50, and the like may be in their normal place in the forward end of the chassis rails. The regenerative motor controller 40, associated power switching components 44, battery charging components 42, DC/DC converter, may be in an acceptable space within the frame rails. The fuel tank 50 and associated fuel supply system necessary for the internal combustion engine 30, along with the required ABS brake module 56, and associated internal combustion engine control unit, may be in a normal space within the frame rails.

One embodiment of the invention includes a small internal combustion engine 30 such at a 0.97 L or 2.4 L derated 25HP engine from Power Systems International (PSI) as the prime mover in the stationary generator mode (state 2) coupled thru an isolation clutch 38 such as, but not limited to an MMC EM clutch from Ogura products. The PSI 0.97 L or 2.4 L engine (or equivalent) may utilize fuels such as gasoline, propane, natural gas or bi-fuel. Alternative embodiments of the invention may include higher torque/lower speed internal combustion engines 30.

Cabin heating may be provided by the internal combustion engine 30 while the vehicle 10 is stopped and may be supplemented by directed infrared heating elements installed high in the cabin to provide additional heat as required while the vehicle 10 is in motion. Additionally, cabin heating may be accomplished via a fossil fuel heater in conjunction with a scavenge heat system from the electronic components, internal combustion engine 30 and heated reservoir.

One embodiment of the invention may include a battery module 46 with 45 kWh usable energy and it's associated Battery Management System (BMS). The battery 46 may be charged externally via any number of level 2 EVSE systems from any number of suppliers and an on board charger 42 such as, but not limited to, model CMP 348 7KW series from the EDN Group.

One embodiment of the invention includes a TM4 1850 series dual shaft motor 22 as the main drive motor and an associated regenerative drive controller 40 such as model CO200HV-A1. It is understood that alternate regenerative drive systems may be employed depending on the size and use of the vehicle 10. 12-volt electrical power may be derived, but is not limited to, as coming from the main 45 kWh battery pack via an EDN model DHF 362 series DC/DC converter.

One embodiment of the invention may include the components of the invention installed in a Workhorse W88 or other suitable chassis. It is understood that any of any number of chassis configurations may be used. In one embodiment of the invention, the 45 kWh usable high-power battery pack is contained within an independent steel frame that spans the chassis frame rails. A 2.4 L PSI multi fuel 25HP internal combustion engine 30 may be mounted in the forward end of the chassis as is customary for vehicles driven by an internal combustion engine. In addition, the electric drive/generator motor may also be located in the forward end of the chassis along with its associated clutches, parking brake, and cooling equipment. In addition, the motor controller 40 and onboard charging equipment 42 may also be located in the forward portion of the chassis. Fuel tank 50 and other ABS braking modules 56 and the like may be mounted in their customary place along the chassis as is common practice in the industry.

An optional auxiliary hydronic heating system 54 for use in cold climates, along with the electric power steering 48 and hydro-boost brake system 56, fuel tank 50 for the internal combustion engine 30 and internal combustion engine exhaust 52 may be included in the vehicle 10. It is understood that the internal combustion engine exhaust may exit from either the driver or passenger side of the vehicle 10.

In various embodiments, the internal combustion engine 30, main electric drive motor 22, associated clutches 24, 38 and regenerative drive unit are configured on a carrier frame for easy alignment and insertion and removal from the chassis of the vehicle 10. In this embodiment of the invention, the parking pawl and sprocket 26 may be integrated into the rear clutch assembly 24 as to form a homogenous unit. Integral to the forward clutch 38 may be a flex plate installed to dampen vibrations from the internal combustion engine 30.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:
1. An electric vehicle comprising:
a battery module;
an electric motor assembly coupled to the battery module and operable in a drive mode and in a generator mode;
at least one ground engaging driven wheel coupled to the electric motor assembly via a first drive shaft assembly;
a first clutch assembly associated with the first drive shaft assembly;

an internal combustion engine operably coupled to the electric motor assembly via a second drive shaft assembly;

a second clutch assembly associated with the second drive shaft assembly; and a controller operable to engage the first clutch assembly and disengage the second clutch assembly when the electric motor is in the drive mode and to disengage the first clutch assembly and engage the second clutch assembly when the electric motor assembly is in the generator mode and the internal combustion engine is driving the second drive shaft assembly to thereby charge the batter module;

wherein the internal combustion engine is operable only when the vehicle is stopped and in a parked mode.

2. The electric vehicle of claim 1 further comprising:

a charger operably connected to the battery module by which the battery module may be charged by connection of the charger to a power source external to the electric vehicle.

3. The electric vehicle of claim 1 further comprising a plurality of ground engaging wheels wherein the internal combustion engine is not operably coupled to any of the plurality of ground engaging wheels to propel the electric vehicle.

4. An electric vehicle comprising:

a battery module:

an electric motor assembly coupled to the battery module and operable in a drive mode and in a generator mode;

at least one ground engaging driven wheel coupled to the electric motor assembly via a first drive shaft assembly;

a first clutch assembly associated with the first drive shaft assembly;

an internal combustion engine operably coupled to the electric motor assembly via a second drive shaft assembly;

a second clutch assembly associated with the second drive shaft assembly; and a controller operable to engage the first clutch assembly and disengage the second clutch assembly when the electric motor is in the drive mode and to disengage the first clutch assembly and engage the second clutch assembly when the electric motor assembly is in the generator mode and the internal combustion engine is driving the second drive shaft assembly to thereby charge the batter module;

a charger operably connected to the battery module by which the battery module may be charged by connection of the charger to a power source external to the electric vehicle;

wherein the first and second clutch assemblies are each disengaged when the charger is charging the battery module via the power source external to the electric vehicle.

5. The electric vehicle of claim 4 wherein the internal combustion engine does not drive the at least one ground engaging driven wheel.

6. The electric vehicle of claim 4 further comprising at least one of:

a fuel tank for the internal combustion engine;

an auxiliary hydronic heating system;

a hydroboost brake system; and an electric power steering pump.

7. The electric vehicle of claim 4 further comprising:

a pair of ground engaging driven wheels;

an axle extending between and to which the pair of ground engaging driven wheels is mounted; and a differential assembly coupling the first drive shaft assembly to the axle.

8. An electric vehicle comprising:

a battery module;

an electric motor assembly coupled to the battery module and operable in a drive mode and in a generator mode;

a pair of ground engaging driven wheels coupled to the electric motor assembly via a first drive shaft assembly;

an axle extending between and to which the pair of ground engaging driven wheels is mounted;

a differential assembly coupling the first drive shaft assembly to the axle;

a first clutch assembly associated with the first drive shaft assembly;

an internal combustion engine operably coupled to the electric motor assembly via a second drive shaft assembly;

wherein the internal combustion engine does not drive the pair of ground engaging driven wheels;

a second clutch assembly associated with the second drive shaft assembly;

a controller operable to engage the first clutch assembly and disengage the second clutch assembly when the electric motor is in the drive mode and to disengage the first clutch assembly and engage the second clutch assembly when the electric motor assembly is in the generator mode and the internal combustion engine is driving the second drive shaft assembly to thereby charge the batter module; and a charger operably connected to the battery module by which the battery module may be charged by connection of the charger to a power source external to the electric vehicle;

wherein the first and second clutch assemblies are each disengaged when the charger is charging the battery module via the power source external to the electric vehicle.

9. The electric vehicle of claim 8 further comprising at least one of:

a fuel tank for the internal combustion engine;

an auxiliary hydronic heating system;

a hydroboost brake system; and an electric power steering pump.

10. A method of operating an electric vehicle having an electric motor assembly coupled via a first clutch assembly to at least one ground engaging wheel, an internal combustion engine coupled via a second clutch assembly to the electric motor assembly, a battery module electrically coupled to the electric motor assembly and a charger electrically coupled to the battery module, the method comprising the steps of:

configuring the electric vehicle for operation in a first state by, (a) disengaging the first clutch assembly;

(b) disengaging the second clutch assembly; and (c) coupling a power source external to the electric vehicle with the charger on the electric vehicle to thereby charge the battery.

11. The method of claim 10 further comprising:

configuring the electric vehicle for operation in a second state by, (d) engaging the first clutch assembly;

(e) disengaging the second clutch assembly;

(f) drawing electric power from the battery module to the electric motor assembly; and (g) operating the electric motor assembly in a drive mode to thereby drive the at least one ground engaging wheel to propel the electric vehicle.

12. The method of claim 11 further comprising:
configuring the electric vehicle for operation in a third state by,
(h) disengaging the first clutch assembly;
(i) engaging the second clutch assembly;
(j) operating the electric motor assembly in a generator mode; and
(k) operating the internal combustion engine to thereby charge the battery module via the electric motor assembly while in the generator mode.

13. The method of claim 12 wherein the operation of the electric vehicle in the third state is accomplished while the electric vehicle is stationary.

14. The method of claim 12 further comprising:
(l) calculating a desired state of charge for the battery module; and
(m) terminating operation of the electric vehicle in the third state once the battery module is at the desired state of charge.

15. The method of claim 11 wherein the internal combustion engine is not engaged to propel the at least one ground engaging wheel during operation of the electric vehicle in the second state.

16. A method of operating an electric vehicle having an electric motor assembly coupled via a first clutch assembly to a pair of ground engaging wheels, an internal combustion engine coupled via a second clutch assembly to the electric motor assembly, a battery module electrically coupled to the electric motor assembly and a charger electrically coupled to the battery module, the method comprising the steps of:
configuring the electric vehicle for operation in a first state by,
(a) disengaging the first clutch assembly;
(b) disengaging the second clutch assembly;
(c) coupling a power source external to the electric vehicle with the charger on the electric vehicle to thereby charge the battery;
configuring the electric vehicle for operation in a second state by,
(d) engaging the first clutch assembly;
(e) disengaging the second clutch assembly;
(f) drawing electric power from the battery module to the electric motor assembly;
(g) operating the electric motor assembly in a drive mode to thereby drive the at least one ground engaging wheel to propel the electric vehicle;
configuring the electric vehicle for operation in a third state by,
(h) disengaging the first clutch assembly;
(i) engaging the second clutch assembly;
(j) operating the electric motor assembly in a generator mode; and
(k) operating the internal combustion engine to thereby charge the battery module via the electric motor assembly while in the generator mode.

17. The method of claim 16 wherein the operation of the electric vehicle in the third state is accomplished while the electric vehicle is stationary.

18. The method of claim 16 further comprising:
(l) calculating a desired state of charge for the battery module; and
(m) terminating operation of the electric vehicle in the third state once the battery module is at the desired state of charge.

19. The method of claim 16 wherein the internal combustion engine is not engaged to propel the at least one ground engaging wheel during operation of the electric vehicle in the second state.

* * * * *